US005933556A

United States Patent [19]

Hawkins

[11] Patent Number: 5,933,556

[45] Date of Patent: Aug. 3, 1999

[54] CONNECTOR

[76] Inventor: David F Hawkins, 5 Warwick Place, Ealing, London, United Kingdom, W5 5PS

[21] Appl. No.: 08/817,026

[22] PCT Filed: Oct. 10, 1995

[86] PCT No.: PCT/GB95/02389

§ 371 Date: Jul. 28, 1997

§ 102(e) Date: Jul. 28, 1997

[87] PCT Pub. No.: WO96/11355

PCT Pub. Date: Apr. 18, 1996

[30] Foreign Application Priority Data

Oct. 10, 1994 [GB] United Kingdom ................... 9420349

[51] Int. Cl.[6] ....................................................... G02B 6/38

[52] U.S. Cl. ................................. 385/56; 385/58; 385/69

[58] Field of Search ................................. 385/56, 58, 59, 385/60, 62, 66, 138, 69

[56] References Cited

U.S. PATENT DOCUMENTS

| | | | |
|---|---|---|---|
| 4,002,345 | 1/1977 | Jankowiak et al. | 277/606 |
| 4,493,529 | 1/1985 | Doty | 350/96.2 |
| 4,548,427 | 10/1985 | Press et al. | 285/55 |
| 4,616,900 | 10/1986 | Cairns | 350/96.2 |
| 5,159,651 | 10/1992 | Gandy | 385/56 |

FOREIGN PATENT DOCUMENTS

| | | |
|---|---|---|
| 0 136 138 A2 | 4/1985 | European Pat. Off. . |
| 0 285 677 A1 | 10/1988 | European Pat. Off. . |
| 0 285 677 B1 | 10/1988 | European Pat. Off. . |
| 0 349 344 A2 | 1/1990 | European Pat. Off. . |
| 0 363 188 A1 | 4/1990 | European Pat. Off. . |
| 3 206 311 A1 | 9/1982 | Germany . |
| 3 833 370 A1 | 4/1990 | Germany . |
| 2 052 662 | 7/1979 | United Kingdom . |
| 2 095 779 | 10/1982 | United Kingdom . |
| 2 193 605 | 2/1988 | United Kingdom . |
| 2 287 077 | 9/1995 | United Kingdom . |

OTHER PUBLICATIONS

Extract from Brochure “Hawke Cable Glands,” Jul. 1994, illustrating Hawke type 153 cable gland.

“Powerbreaker” Cable Connector, sold by RS Components, Ltd. (1990–1994).

Double Super Seal Bulk Head Connector, Drawing No. NC274, dated Jan. 19, 1990, John Guest Ltd.

*Primary Examiner*—Hung N. Ngo
*Attorney, Agent, or Firm*—Foley, Hoag & Eliot, LLP

[57] ABSTRACT

The invention provides a connector for connecting to an end of a conduit tube of the type which carries fiber optic communications cables. The connector comprising a body having a through bore through which a fiber optic cable may pass. At least one end of the body being arranged to receive therein an end of a conduit tube for carrying the cable. The body having first resilient sealing means for encircling the conduit tube and compression means for compressing the resilient sealing means and the conduit tube. Characterized in that the body has two main body portions arranged for relative axial movement therebetween, and means for drawing the two body portions together, and in that a second resilient means is disposed axially between two confronting surfaces of the two main body portions. The second resilient means being compressible by tightening the two main body portions together so as to deform the second resilient sealing means radially inwardly and into sealing contact with the fiber optic cable.

19 Claims, 10 Drawing Sheets

301 302 302a 380 383 382 381

330 330a 371a 330b 371 303 370

CONNECTOR

This invention relates to a connector for connecting to an end of a conduit tube of the type used to carry fibre-optics cables. More particularly, the invention relates to a gas-tight connector for use at points of entry into buildings.

Fibre-optics cables are becoming increasingly popular as a telecommunications medium and typically are installed alongside existing service installations. A typical fibre-optics communications line consists of a bundle of optical fibres encased in a protective sheath which in turn is carried in a conduit tube or pipe which may for example be formed of a plastics material. The conduit tube is first installed and then the sheathed optical fibres are inserted in the conduit. Insertion of the sheathed optical fibres in the conduit may be effected by a pneumatic method which involves driving the fibre optic cable along the conduit with compressed air, or by pulling or drawing the sheathed fibres along the conduit.

In order to assist the former process, the outer surface of the cable is deliberately provided with a rough surface to increase its air resistance while the inner surface of the conduit is provided with a low friction coating to prevent the cable from being damaged as it is driven along the conduit.

Adjoining lengths of conduit tube are connected by means of connectors which may be of the push-fit variety or can be provided with a threaded collar compression mechanism.

Where installation of the fibre-optic cable is by pneumatic means, the connectors must be sufficiently air-tight to retain the air-pressure needed to drive the cable along the conduit but they do not need to be absolutely air-tight for this purpose. Indeed, as a result of the damage inflicted on the surfaces of conduit tubes by the gripping rings conventionally used in push fit connectors, there is usually a leak path along which gases can escape from the connector, or permeate into the connector.

A major concern of communications installation engineers is to ensure that when a service line enters a building, it does not create a channel along which gases from outside can also enter the building. This is a particular concern when, for example, the service line in question is laid alongside, or in the close vicinity of, a gas main, or is laid in an area where gases are being formed as result of the decomposition of refuse. Although leakage from a gas main may be minimal, permeation of the gas into a service line such as fibre-optic cable channel over a period can lead to significant quantities of gas entering a building unless steps are taken to provide a gas-block at the entry point into the building. This is particularly important when the utility to which the service channel is connected, eg a telephone exchange, is retained within a casing or housing or other confined space. Under such circumstances, a build-up of gases to explosive levels could result, with potentially devastating consequences. It has therefore become standard practice to provide a gas block at the point of entry into buildings.

In order to prevent gases that have permeated into a fibre-optics line from entering a building, it is necessary to provide a seal between the outer surface of the conduit tube and the connector, and a seal between the fibre-optic cable itself and either the conduit tube wall or the wall of the connector. At present connectors provided with a screw collar compression mechanism, in which a resilient sealing member such as an O-ring is clamped down onto the conduit tube, to give the necessary gas-tight seal between conduit tube wall and connector wall. However, in order to provide a seal around the fibre-optic cable, an arrangement as shown in FIG. 8 is employed. Thus, a length of clear plastics tube A is connected to connector B, the clear plastics tube being formed into a loop which must usually be of a minimum radius of 5 mm in order to avoid damage to the fibre-optic cable. At the lowest point L of the loop, a small hole is made and a silicone sealant S introduced by means of a syringe. The silicone sealant cures to provide a gas-tight seal between the wall of the tube A and the fibre-optic cable F inside the tube.

Whilst effective, the aforementioned method of forming a seal suffers from a number of drawbacks. Firstly, it is somewhat messy, and the use of a sealant, whilst acceptable in an industrial or office setting, could be less acceptable in a domestic setting where the potential would exist for the sealant to soil carpets and other furnishings if used carelessly. The other main drawback is the amount of space taken up by the loop of tubing. Thus there remains a need for a means of providing a gas block at the point of entry into a building which is more compact and less messy, and it is an object of the invention to provide such a means.

Accordingly, in a first aspect, the invention provides a connector for connecting to an end of a conduit tube of the type which carries fibre-optics communications cables; the connector comprising a body having a through bore through which a fibre-optics cable may pass; at least one end of the body being arranged to receive therein an end of a conduit tube for carrying the cable; the body having first resilient sealing means for encircling the conduit tube and compression means for compressing the resilient sealing means against the conduit tube around its circumference so as to provide a substantially gas-tight seal between the body and the conduit tube; characterised in that the body has two main body portions arranged for relative axial movement therebetween, and means for drawing the two main body portions together; and in that a second resilient sealing means is disposed axially between two confronting surfaces of the two main body portions; the second resilient sealing means being compressible by tightening the two main body portions together so as to deform the second resilient sealing means radially inwardly and into sealing contact with the fibre-optic cable, thereby to form a substantially gas-tight seal between the body and the fibre-optic cable.

In one embodiment the first and second resilient sealing means are constituted by a unitary sealing member. For example, the unitary sealing member may have an enlarged diameter portion for receiving the end of the conduit tube, and a reduced diameter portion for receiving the fibre-optics cable.

The enlarged diameter portion and reduced diameter portion are preferably separated by a generally axially oriented circumferential face. The generally axially oriented circumferential face is preferably orthogonal to the longitudinal axis of the connector body.

In another embodiment, the first and second resilient sealing means are separate entities. For example, the first resilient sealing means may be axially spaced apart from the second resilient sealing means. The first resilient sealing means can take the form of an array of one or more compressible O-rings.

The connector body has two main body portions arranged for relative axial movement therebetween. One of the body parts may have a socket formation arranged to receive a spigot formation on the other body portion. The two body portions are provided with means for enabling the said portions to be drawn together, and such means can take the form of a threaded collar associated with one body portion which engages a thread on the exterior of the other body portion. The collar is preferably rotatably mounted on one portion such that it does not cause rotation of the said one body portion when it is threaded onto the other body portion.

The two body portions together may define an annular recess therebetween in which a sealing member comprising at least the second resilient sealing means may sit. With such an arrangement, tightening the two body portions together causes compression of the sealing member between confronting surfaces of the respective body portions such that the second resilient sealing means is deformed radially inwardly and into sealing contact with the fibre-optic cable.

In one preferred embodiment the annular recess accommodates a unitary sealing member as hereinbefore defined.

At least one end of the connector body is arranged to receive therein an end of a conduit tube for carrying the cable. In one embodiment however, two ends of the body are arranged to receive therein the ends of two respective conduit tubes. Where the sealing member is a unitary sealing member comprising both first and second resilient sealing means, the sealing member can be arranged to receive therein at opposite ends thereof the ends of two conduit tubes. In alternative embodiment, however, a pair of sealing members may be provided, an intermediate annular member of greater rigidity than the two sealing members being disposed axially therebetween. The intermediate annular member preferably has inclined or curved axial surfaces which assist the second resilient sealing means to be deformed radially inwardly as the two main body portions are tightened together. For example, the intermediate annular member can have a substantially bi-concave profile.

In a further embodiment, the invention provides a sealing member for use in a connector for connecting to an end of a conduit tube of a pipe which carries fibre-optic communication cables; the sealing member being formed of an elastomeric material and having a generally cylindrical shape; the sealing member having at at least one end thereof an enlarged bore portion for encircling and receiving an end of a conduit tube, and a reduced diameter bore portion for receiving a fibre-optics cable; the sealing member having axial end surfaces which are inclined rearwardly from the radially inner edge thereof so as to form a frustoconical abutment surface.

In a still further embodiment, the invention provides a sealing means for use in a connector for connecting to an end of a conduit tube of the type which carries fibre-optics communication cables; the sealing means comprising a pair of sealing members, each said sealing member having an enlarged bore portion for receiving an end of a conduit therein, and a reduced diameter bore portion for receiving a fibre-optics cable, and having an axial end surface which is inclined rearwardly from a radial inner edge thereof; and an intermediate annular member of more rigid material than the two said sealing members, the intermediate annular member being arranged to be disposed axially between the two sealing members, the annular member being of a generally bi-concave form to assist compression and radial inward deformation of the sealing members.

The invention will now be illustrated in more detail, but not limited, by reference to the specific embodiment shown in the accompanying drawings, of which:

Figure 1:
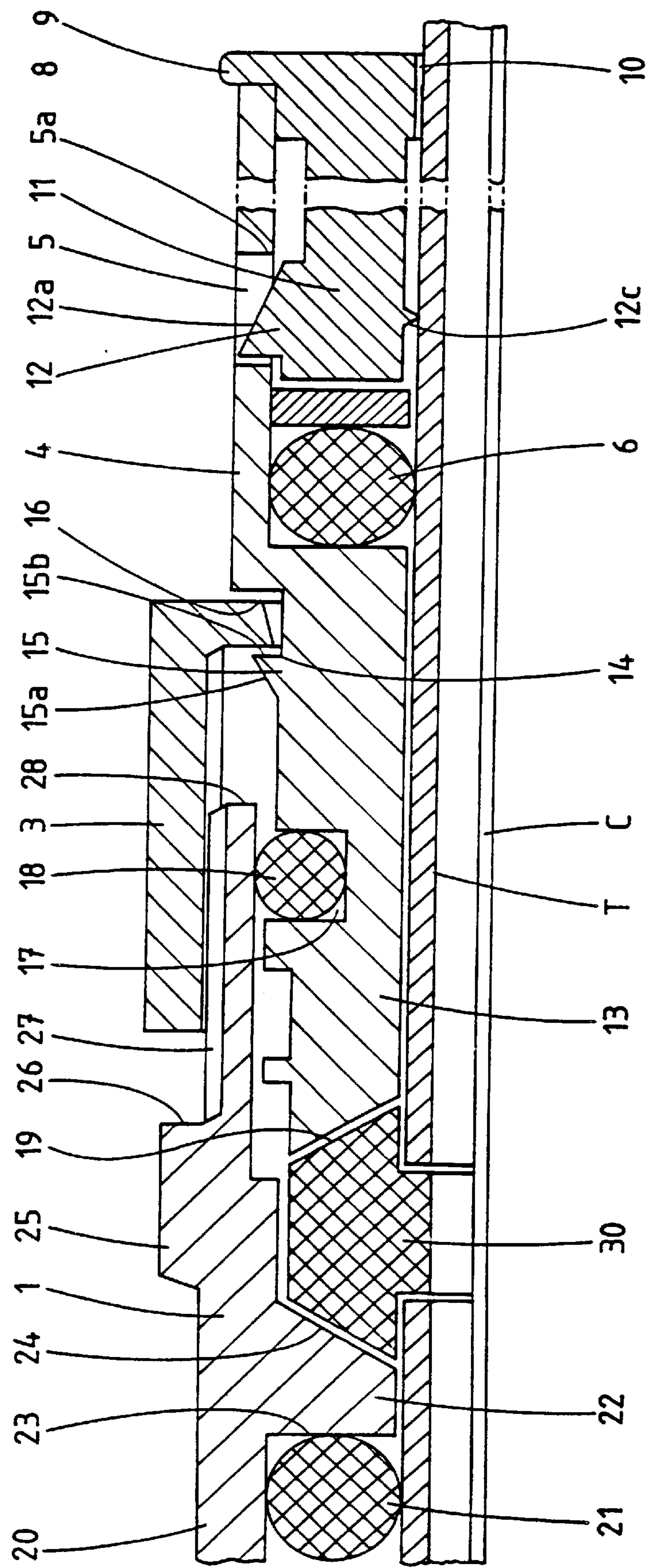
FIG. 1 is a schematic side sectional elevation through a connector according to one embodiment of the invention.
Figure 2:
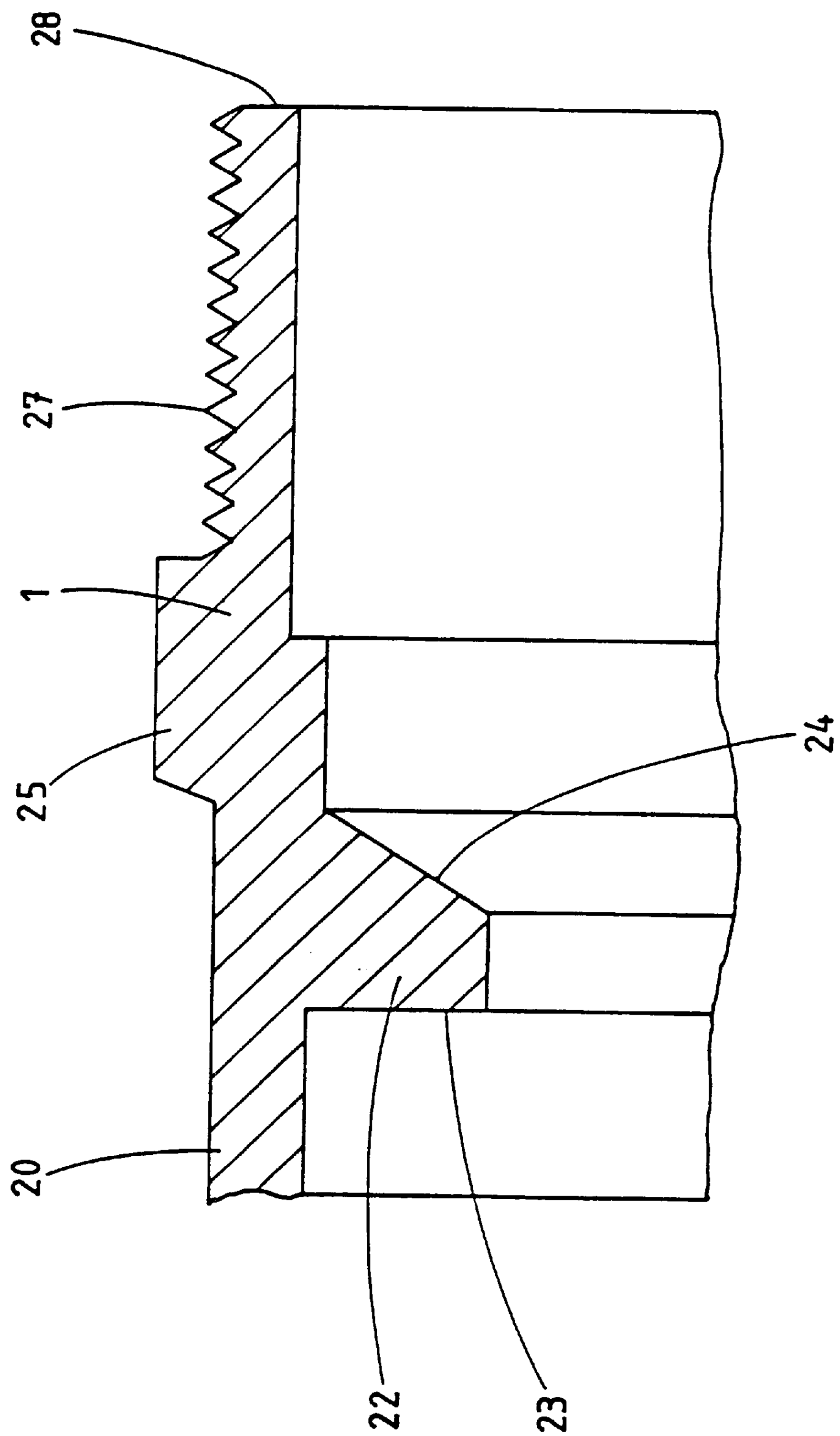
FIG. 2 is a side sectional elevation through the "female" portion of the connector of FIG. 1.
Figure 3:
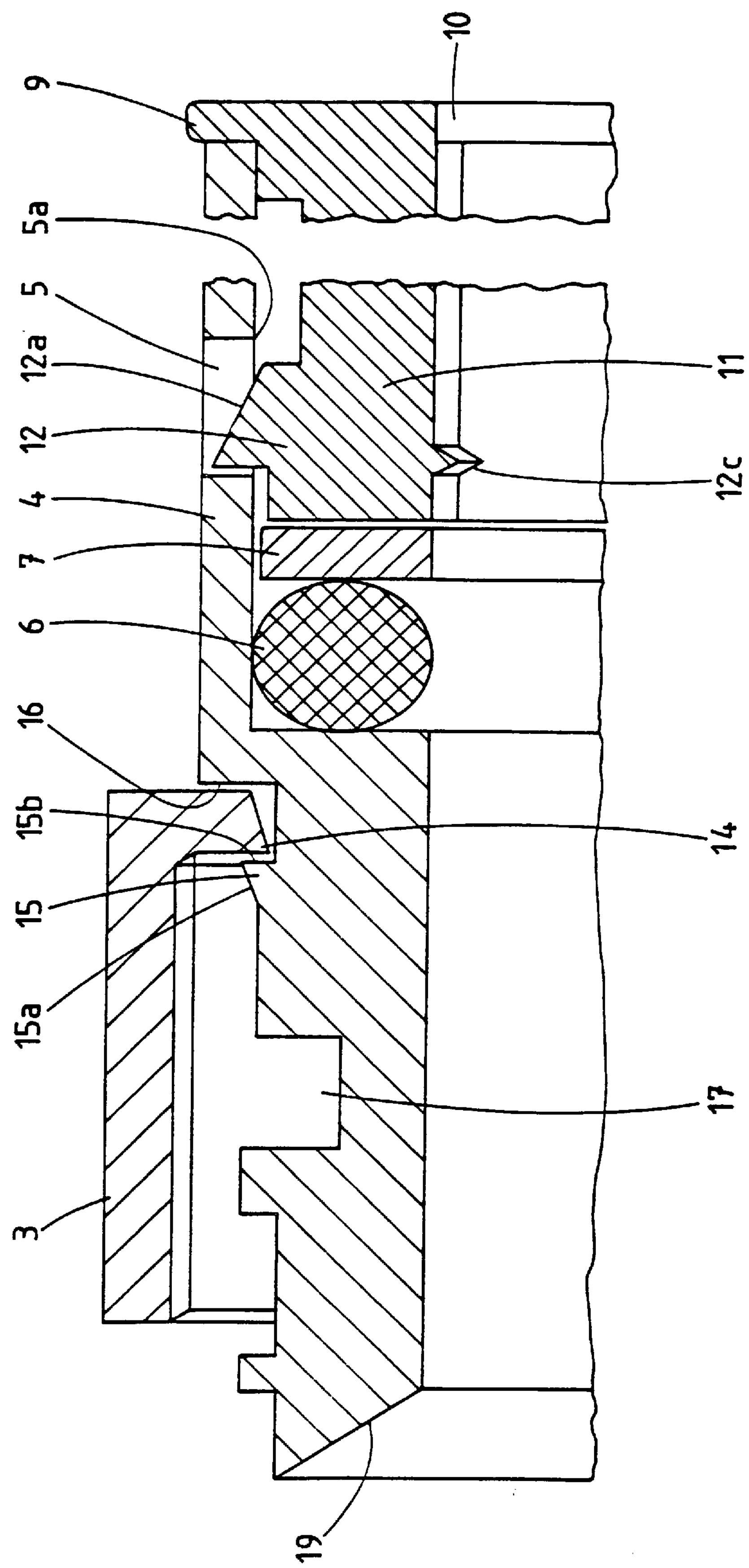
FIG. 3 is a side sectional elevation through the "male" portion of the connector shown in FIG. 1.
Figure 4:
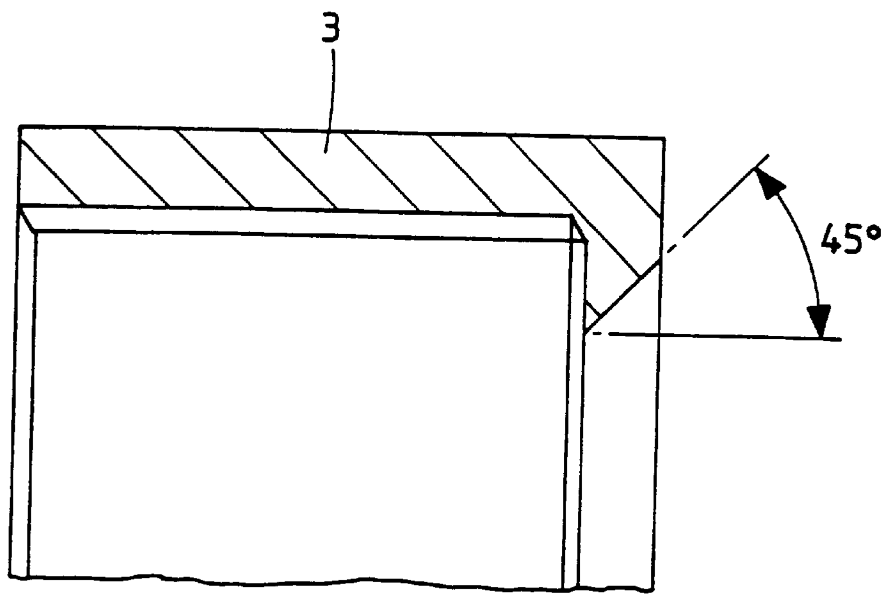
FIG. 4 is a side sectional elevation through the screw collar of the connector shown in FIG. 1.
Figure 5:
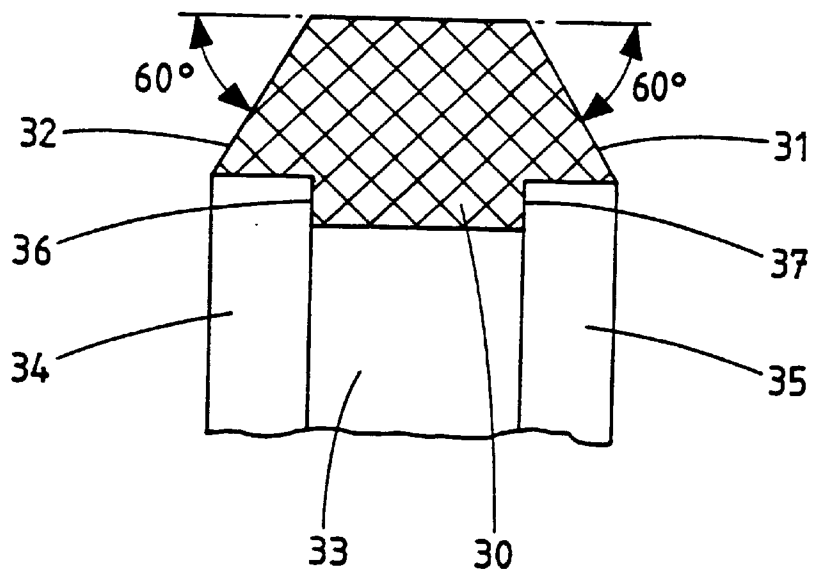
FIG. 5 is a sectional elevation through the sealing gasket in FIG. 1.

Referring now to the figures, it can be seen that a connector according to one embodiment of the invention comprises a connector main body formed in two halves, the female portion 1 and the male portion 2, which are secured together by means of a threaded collar 3 which is rotatably mounted on the male portion 2.

Male portion 2 has an enlarged diameter portion 4 having a number of openings 5 spaced at intervals around its circumference. An O-ring 6 formed of nitrile rubber and a washer 7 formed of a suitable engineering plastics material such as polyacetal are arranged within the interior of the enlarged diameter portion and a collet 8 is fitted into the open end of portion 4. The collet 8 has an annular flange portion 9 which abuts against the axial end face 4*a* of the connector body portion 4, the flange portion 9 having a central opening 10 of a diameter just large enough to receive a conduit tube for a fibre-optic cable. Extending axially inwardly of the flange are resilient fingers 11, and the collet 8 is retained within portion 7 by means of pawl elements 12 formed integrally with the resilient fingers 11. In this embodiment, there are four resilient fingers, although there could be fewer or more if desired. Pawl elements 12, which locate in openings 5 in the wall of portion 7, are provided with inclined camming surfaces 12*a* which bear against the edges 5*a* of the openings. Formed integrally with the radially inner surface of each resilient finger 11 are gripping ridges or teeth 12*c* for gripping into and holding the conduit tube T. The arrangement of the enlarged diameter portion 4, O-ring 6, washer 7, and collet 8 together constitute a means for retaining the conduit tube T within the connector body .

In order to connect the conduit tube T to the connector body portion 2, the end of the tube T is pushed through the central opening in the flange portion and into the hollow interior of the portion 2. As the tube end is pushed into the body, it forces apart the resilient fingers 9 so that they protrude further into the openings 5 in the wall of the body portion 2. The resilient fingers 9 and their gripping ridges or teeth 12*c* then exert a gripping action on the tube wall. By virtue of the camming surface 11*c* any attempt to withdraw the collet 8 from the connector body portion 4 causes the edge 5*a* to cam along the camming surface 12*a* such that the pawl element 10 and its associated resilient finger 9 are deformed radially inwardly thereby increasing the gripping force of the fingers and causing the ridge or teeth 12*c* to dig further into the surface of the tube. Thus retraction of the tube T from the connector body is prevented. This aspect of the connector is conventional.

Extending axially from the enlarged diameter portion 4 of the male half 2 of the connector is a spigot portion 13. Spigot portion 13 has an annular recess 14 defined by annular ridge 15 and axial face 16, which serves to retain screw collar 3. Annular ridge 15 has an inclined surface 15*a* to enable the screw collar to be snapped into place and an abutment surface 15*b* for preventing removal of the collar once it has been snapped into place. The spigot portion 13 is provided with a further, and deeper, annular recess 17 nearer to its axial end. Annular recess 17 serves to accommodate a sealing member 18, which in this embodiment is an O-ring formed of nitrile rubber. The axial end face 19 of the spigot portion is inclined radially outwardly for reasons which will become apparent.

The female portion 1 of the connector body has an end portion 20 having an inner diameter corresponding to the enlarged diameter portion 4 of the male half 2 of the connector body and which is provided with a gripping collet/O-ring /washer assembly of an identical type to that of the male portion, and functions in an identical manner. Only the O-ring component 21 of this assembly is shown in the Figures.

The female half 1 of the connector body has a radially inwardly extending flange 22, one axial face 23 of which is perpendicular to the axis of the connector and serves as an abutment for the O-ring. The other axial face 24 is inclined and in use, together with the inclined end face 19 of the spigot portion of the male half 2, defines an annular recess for accommodating a sealing member 30.

Extending around the outer circumference of the female connector half 1 is an annular flange or ridge 25 having an axial face 26 which serves as a stop for the screw collar 3. The outer surface 27 of the connector half 1 extending from the flange 25 towards the end 28 of the connector half 1 is threaded to receive the screw collar 3.

The sealing member 30 is a n annular member having a generally trapezoidal cross-section, with inclined surfaces 31 and 32 being arranged in use to abut against the inclined axial faces 19 and 24 respectively of the male and female halves. Sealing member 30 has a through bore divided into a reduced diameter region 33 flanked by two larger diameter regions 34 and 35. The reduced diameter region 33 is separated from the larger diameter regions 34 and 35 by axial faces 36 and 37 respectively. The larger diameter regions are of a diameter just large enough to accommodate the ends of conduit tubes T, the axial faces 36 and 37 serving as end stops for the tube ends. The sealing member is formed from a material which is sufficiently rigid that the axial faces are not deformed to an extent whereby the tube ends can be forced into the reduced diameter region, but is sufficiently deformable to form a gas-tight seal around the tube end. A suitable material for this purpose is a silicone rubber having a Shore hardness in the region 45 to 55, preferably approximately 50.

In use, the female 1 and male 2 halves of the connector are loosely connected together by engaging the screw collar 3 with the thread on the outer surface of the female half 1 and rotating the threaded collar 3 sufficiently to secure the two halves together but without causing any substantial compression of the sealing member 30. The ends of two conduit tubes T are then inserted into the respective ends of the connector halves such that the tube ends butt up against the axial faces 36 and 37 of the sealing member 30. A fibre-optic cable C of conventional type can then be driven along the conduit tubes and through the connector by means of compressed air in conventional fashion. At this juncture, since the sealing member is in an uncompressed or only lightly compressed state, a gas leakage path may exist between end face 18 of the male body half, and inclined surface 31 of the sealing member 30. However, the sealing member 18 located in the annular recess on the outer surface of the spigot portion serves to prevent the escape of compressed air during the installation of the fibre-optic cable C.

Following the installation of the cable C, the screw collar 3 is rotated and screwed onto the female half 1 until the end face 3*a* of the collar abuts against the flange 25. As the collar is tightened, the sealing member 30 is compressed between the axial faces 19 and 24 of the two connector halves and, by virtue of the inclination of the axial faces, is deformed radially inwardly. The radially inner walls of the larger diameter regions are deformed into sealing engagement with the outer diameter of the conduit tube whilst the radially inner wall of the reduced diameter region is deformed into sealing engagement with the fibre-optic cable C. Thus the sealing member 30 not only provides a seal against the conduit tube, but also provides a seal against the fibre-optic cable itself. The connector of the invention therefore avoids the need to use messy liquid sealant compositions to provide a gas-tight seal around a fibre-optic cable at the point of entry into a building, and provides a connector which can be installed simply and quickly whilst still providing the required degree of protection against unwanted ingress of gas. The connector of the invention is thus advantageous with regard to the known connector/sealing arrangement shown in FIG. 7 and described above.

Figure 6:
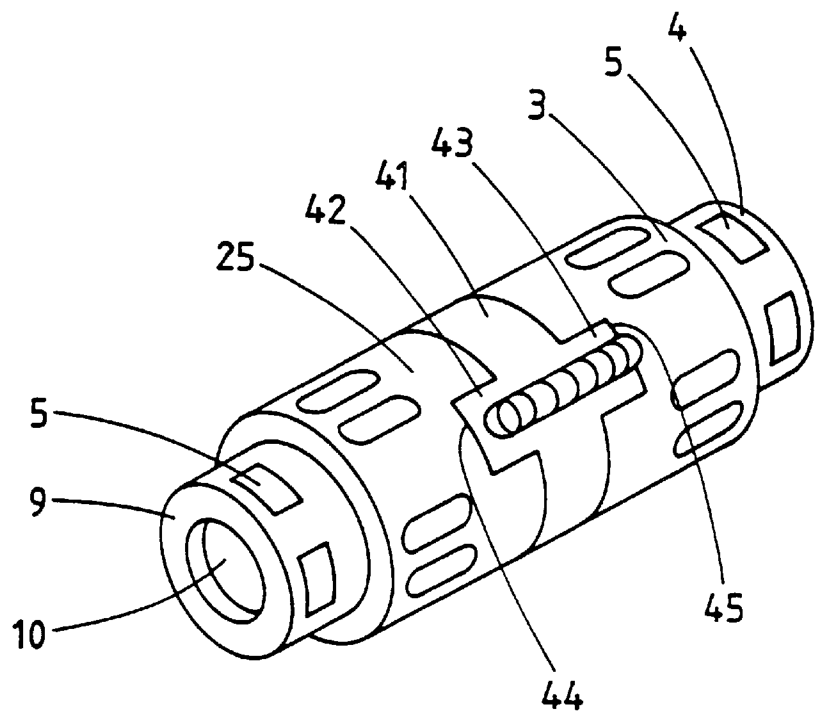
FIG. 6 is an isometric view of a connector according to a second embodiment of the invention.
Figure 7:
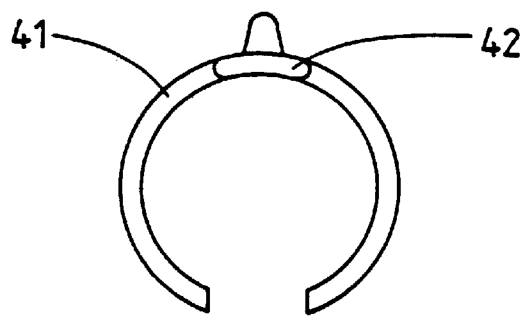
FIG. 7 is an end view of a C-ring indicator of the embodiment of FIG. 6.
Figure 8:
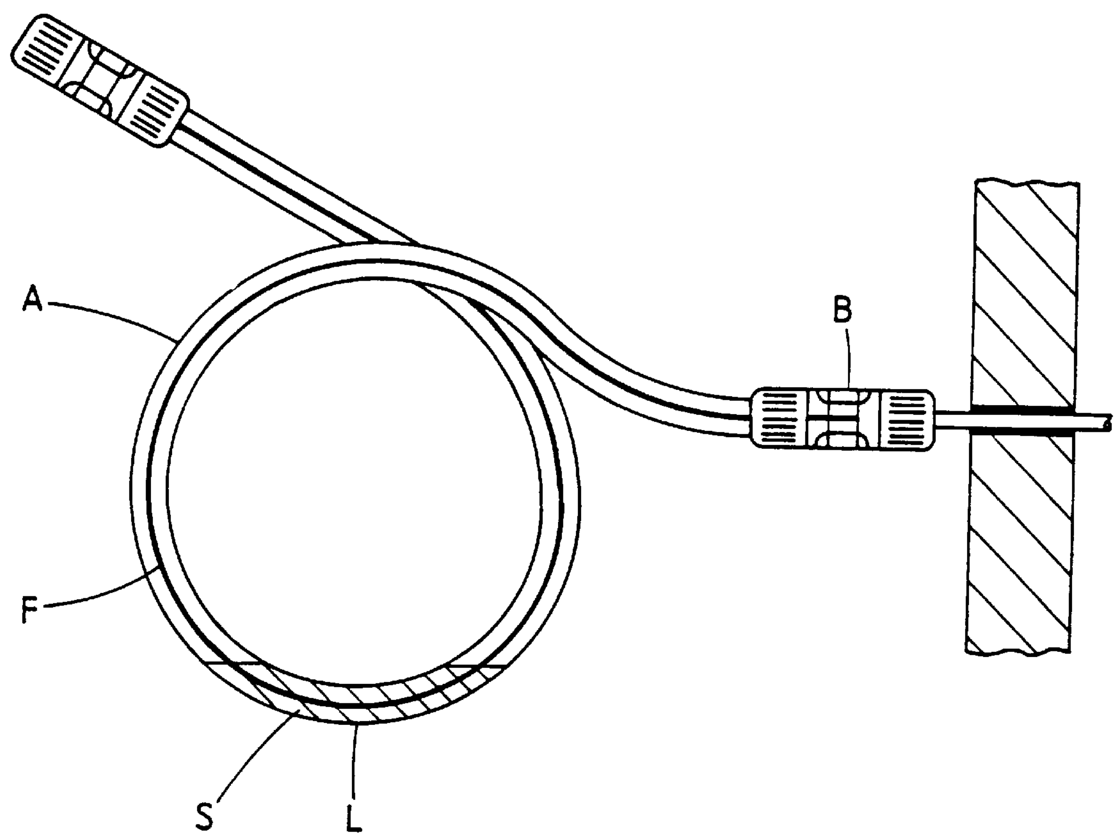
FIG. 8 is a schematic view of a previously known arrangement for sealing a fibre-optics cable.

A modification to the embodiment of FIGS. 1 to 5 is illustrated in FIGS. 6 and 7. An important requirement of any connection system is that the engineer installing the fibre-optic service line should be able to tell at a glance whether the connectors have been fitted together correctly. To assist in this respect, the connector of FIGS. 6 and 7, which is otherwise identical to the connector of FIGS. 1 to 5, is provided with a distinctively coloured C-washer 41 which sits about the threaded portion of the female body half 1 between the annular flange 25 and the screw collar 3. The C-washer 41 is provided with axially extending projections 42 and 43 which mate with complimentary recesses 44 and 45 in the surfaces of the flange 25 and collar 3.

When the connector is initially assembled, the collar 3 is screwed onto the female connector half until it comes into contact with the C-washer 41 and the axial projections 42 and 43 are in register with the recesses 44 and 45. At this point, the installer will know that the two body halves are securely connected together but that no compression of the sealing member 30 has taken place. The fibre-optic cable C may therefore be driven through the connector with compressed air without a compressed sealing member forming a blockage. Once the cable is in place, the C-washer can be removed and the connector halves fully tightened together. The installer will thus be able to tell at a glance that the connector has been correctly installed because firstly the distinctively coloured C-washer is no longer present and secondly there is no gap between the screw collar 3 and the annular flange 25.

Figure 9:
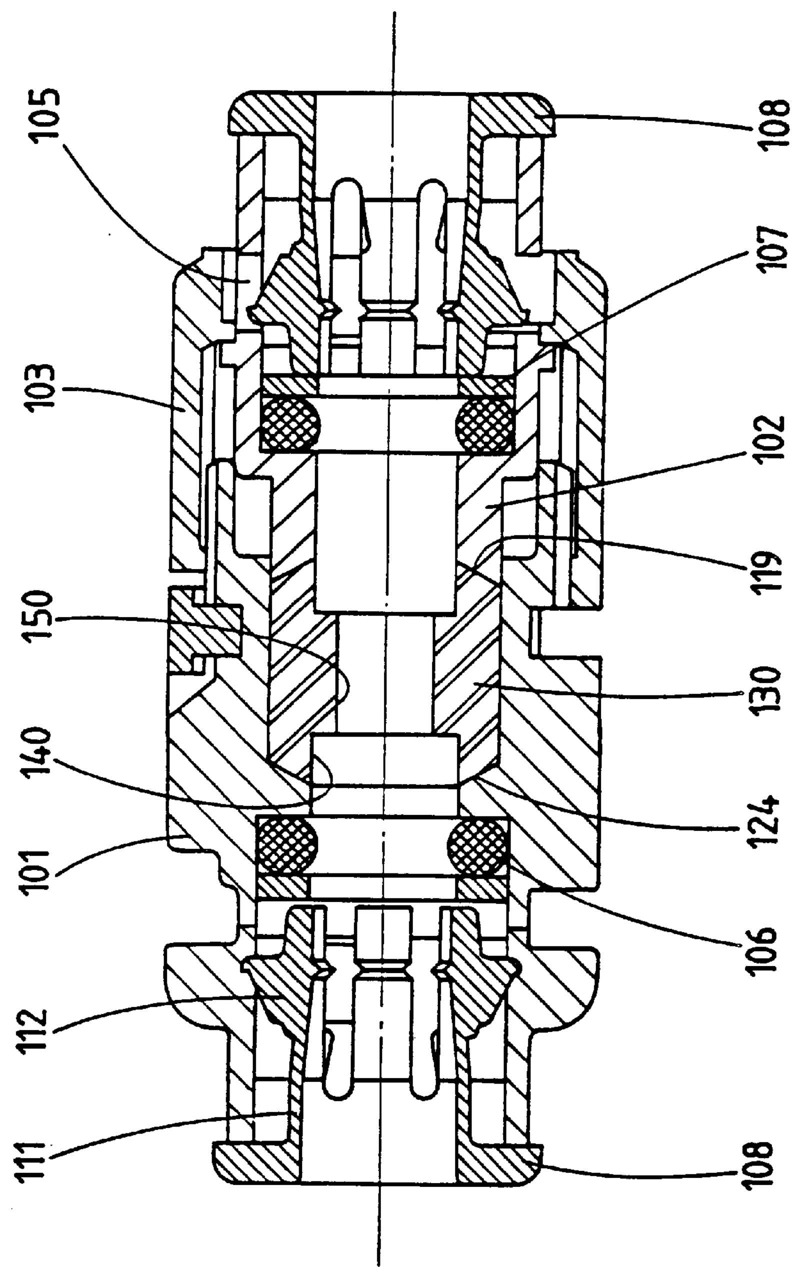
FIG. 9 is a longitudinal sectional elevation through a connector generally similar to that illustrated in FIGS. 1 to 7.

FIG. 9 is a full sectional elevation of a connector generally similar to the embodiments illustrated in FIGS. 1 to 8. Thus, the connector body has a pair of body portions 101 and 102 which correspond generally to body portions 1 and 2 in the embodiment shown in FIG. 1. Disposed within the external ends of body portions 101 and 102 are collets 108 respectively. Collets 108 are configured so as to be insertable into the ends of the connector body portions 101 and 102, the pawl elements 112 on the resilient finger portions 111 of the collets 108 locating in openings 105 so as to hold the collet in place. The axially inner ends of the collets 108 abut against annular washers 107 and O-rings 106 respectively. The collets 108 function in the same manner as the collet 8 in FIG. 1 and thus require no further description here.

As with the embodiment of FIG. 1, a screw collar 103 is provided which engages a thread on the outer surface of body portion 101 enabling the two body portions to be tightened together.

A resilient sealing member 130 is disposed in an annular groove formed between axial end faces 124 and 119 of the body portions 101 and 102 respectively. Tightening the two body portions 101 and 102 together compresses the sealing member 130 urging the radially inner surface 140 against the outer surface of a conduit tube and the inner surface 150 into contact and sealing engagement with a fibre-optic cable (not shown).

Figure 10:
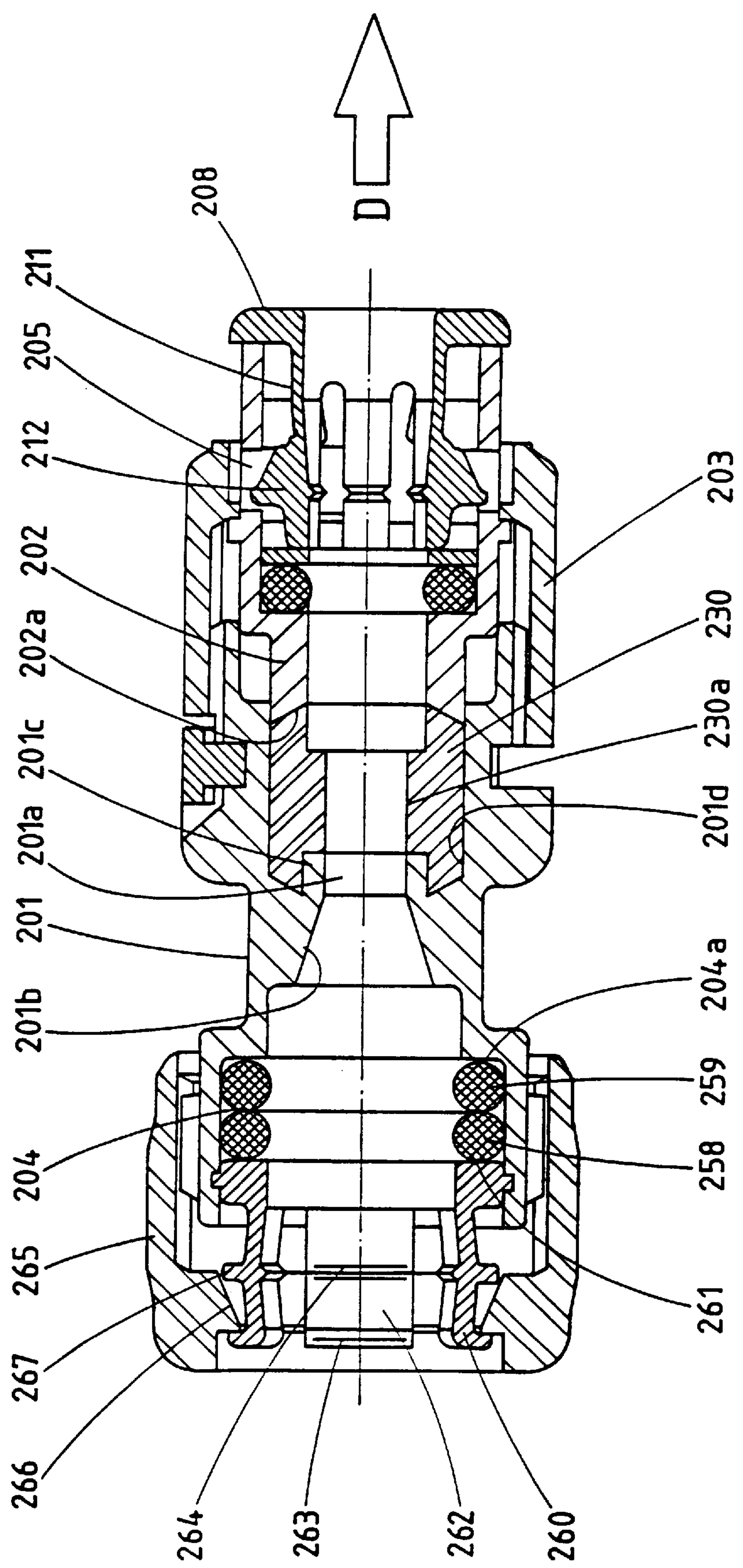
FIG. 10 is a longitudinal sectional elevation through a connector according to a further embodiment of the invention.

FIG. 10 illustrates a further embodiment of the invention in which the connector is provided with separate first and second resilient sealing means.

As with the previous embodiments, the connector comprises body portions 201 and 202 which are connected together by means of a threaded cap 203 which engages and screws onto the threaded outer surface of body portion 201. Body portion 201 has an enlarged bore portion 204 within which are located a pair of O-rings 258, 259 which are formed from a nitrile rubber (preferably of 70 shore hardness). Collet 260 is located within enlarged bore portion 204, an axial end face 261 of the collet serving to compress the O-rings against axial wall 204*a* of the enlarged bore portion 204. Collet 260 has a plurality of axially extending fingers 262 each of which has ridges 263 and 264.

A screw cap 265 fits over the collet 260 and engages a thread of the external surface of enlarged bore portion 204 of body portion 201. Screw cap 265 has a radially inclined camming surface 266 which engages an annular rib 267 as the cap is screwed onto the body portion 201. As the cap 265 is screwed tightly onto the body portion 201, the camming surface 266 engages rib 267 deforming the fingers 262 radially inwardly so that the gripping ridges 263 and 264 bite into the surface of the conduit tube (not shown). At the same time, axial end surface 261 compresses the O-rings 258 and 259, deforming them radially inwardly and into sealing contact with the external surface of the conduit. Thus, in this embodiment, the O-rings 258 and 259 function as the first resilient sealing means.

Body portion 201 has a portion 201*a* having a reduced diameter bore, the reduced diameter bore and enlarged diameter bore regions being linked by a frustoconical surface 201*b*. At the axially inner end of frustoconical surface 201*b*, there is provided an axially extending annular wall portion 201*c* which, together with surface 201*d*, defines a recess for accommodating a sealing member 230. Sealing member 230 is of a similar profile to the sealing member 30 illustrated in FIGS. 1 to 7.

Body portion 202 is provided with a push-fit collet 208 which has resilient finger 211 and pawl elements 212 which locate in opening 205 in the wall of body portion 202 in the same manner as the collets 8 and 108 shown in FIGS. 1 and 9 respectively. Body portion 202 has a spigot portion provided with a radially inclined axial end wall 202*a* which abuts against sealing member 230. As with the embodiments shown in FIGS. 1 to 7 and 9, as screw cap 203 is rotated to tighten the body portions 201 and 202 together, the sealing member 230 is compressed such that the central portion 230*a* is deformed radially inwardly and into sealing engagement with a fibre optic cable (not shown) passing therethrough. At the same time, the larger diameter bore end portion of the sealing member 230 is deformed radially inwardly and to sealing engagement with a conduit (not shown).

It will be appreciated from the foregoing that the embodiment of FIG. 10 differs from the previous embodiments in that one end, i.e. the end defined by body portion 202, the sealing member 230 functions as a unitary sealing member and provides a seal against both the conduit tube and the fibre optic cable. However, at the other end of the connector, as defined by body portion 201, the sealing member 230 only seals against the fibre optic cable, and a separate sealing means defined by O-rings 258 and 259 provide the sealing engagement with the conduit tube. A connector of the type shown in FIG. 10 would typically be connected up such that any gas flow along the conduit tube and towards the connector would be in the direction D; i.e. body portion 201 would be oriented towards the building exterior in any gas-block arrangement.

Figure 11:
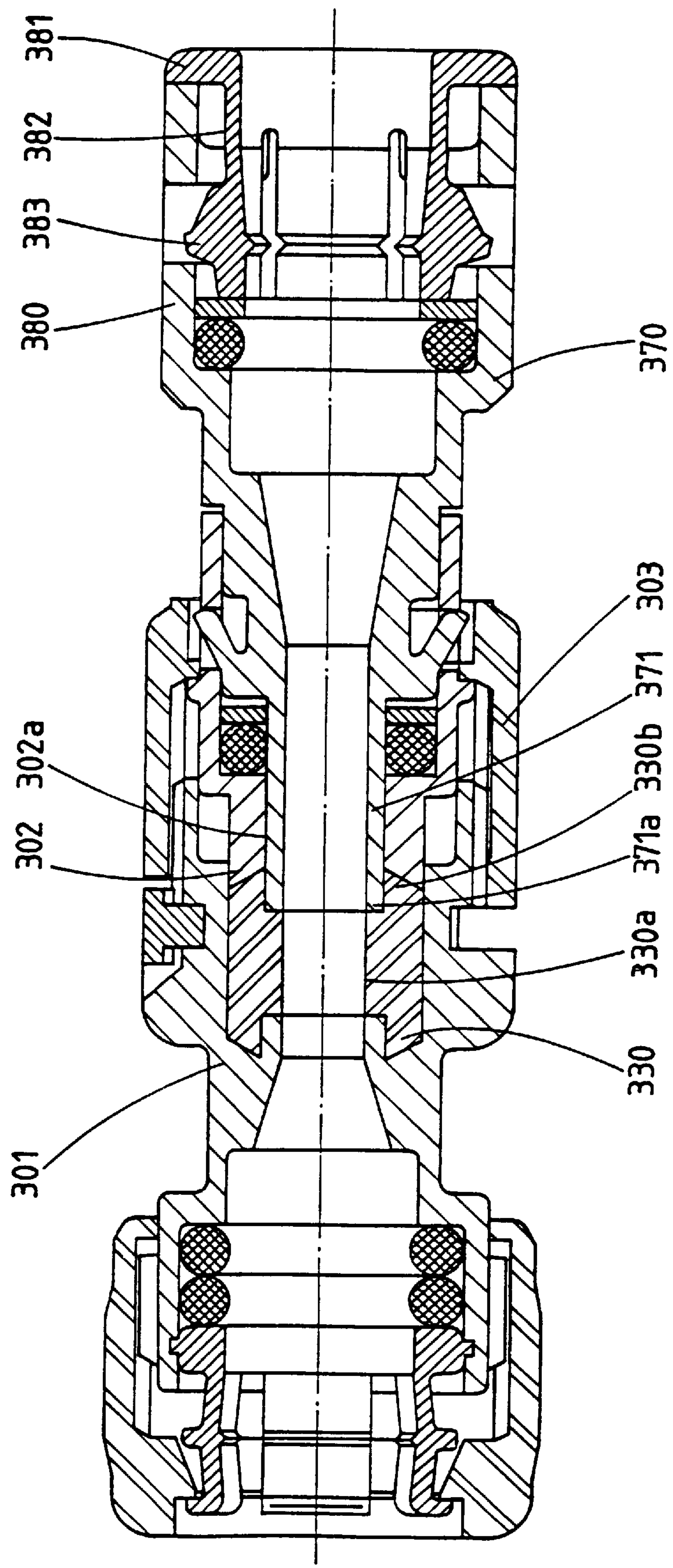
FIG. 11 is a longitudinal sectional elevation through a connector according to another embodiment of the invention.

FIG. 11 illustrates a connector according to a further embodiment of the invention. In this embodiment, the connector comprises two main body portions 301 and 302 coupled together by means of screw cap 303 which engages an external thread of body portion 301. Body portion 301 is constructed in a manner virtually identical to the body portion 201 illustrated in FIG. 10 and hence need not be further described here. Body portion 302 is also virtually identical to body portion 202 in FIG. 10 except that instead of collet 208, a third body portion 370 is located therein. Body portion 370 has a spigot portion 371 which is received in spigot portion 302*a* of the body portion 302, the end 371*a* of spigot portion 371 being received within an enlarged diameter bore portion 330*b* of the sealing member 330.

As the screw cap 303 is rotated to tighten body portions 301 and 302 together, the sealing member 330 is compressed and caused to deform radially inwardly such that the central portion 330*a* of the sealing member deforms radially inwardly and into sealing engagement with the fibre optics cable (not shown), whilst the portion 330*b* is deformed into sealing engagement with the end portion 371*a* of spigot 371.

Third body portion 370, which functions as an adaptor, has an enlarged diameter end portion 380 in which it receives a collet 381. Collet 381 is provided with a resilient finger 382 and pawl element 383 which enables the collet to be retained within end portion 380 in the same manner as collets 8 and 108 in FIGS. 1 and 10.

Figure 12:
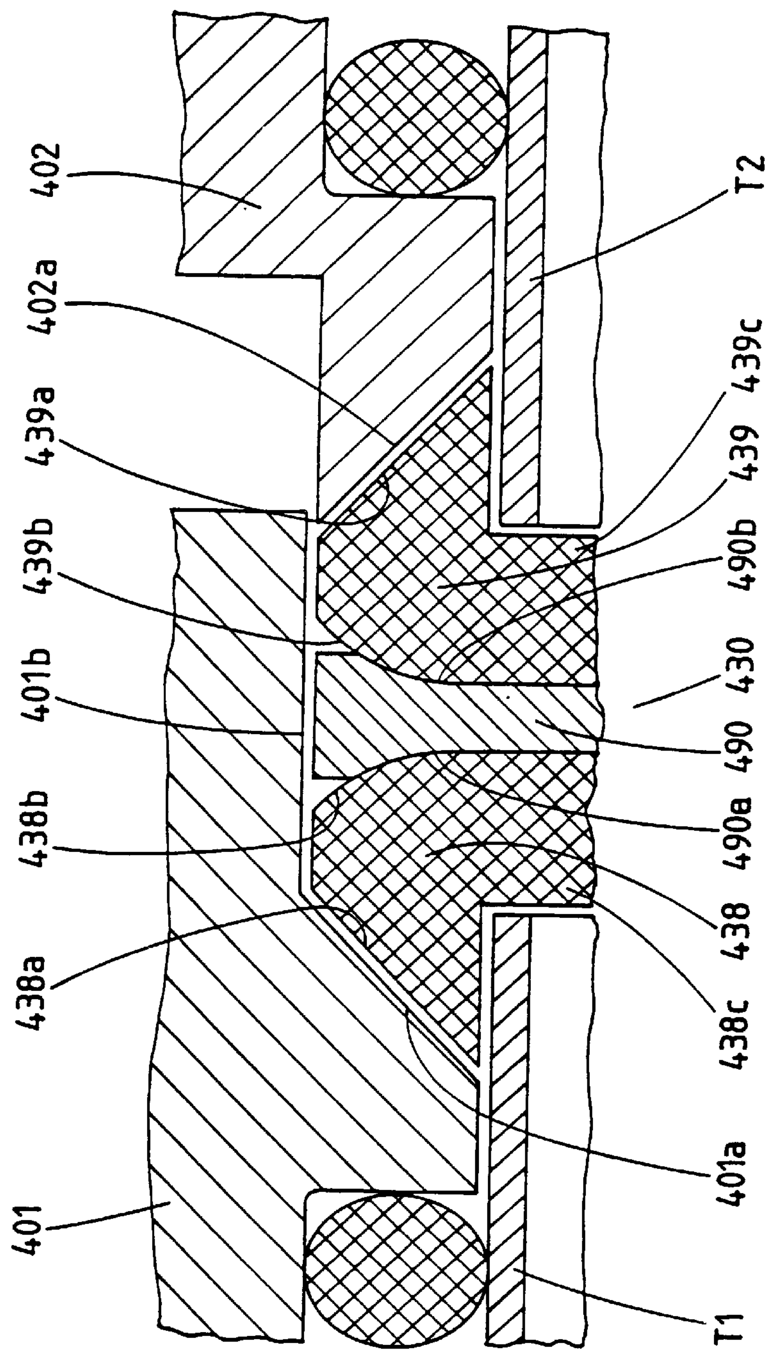
FIG. 12 is a partial sectional elevation illustrating an alternative sealing means.

An alternative sealing means is shown in FIG. 12. According to the embodiment shown in FIG. 12, the connector has body portions 401 and 402 which each have inclined axial surfaces 401*a* and 402*a*. Opposing surfaces 401*a* and 402*a*, together with radial surface 401*b* of the body portion 401, define an annular recess in which sealing means 430 is located. Sealing means 430 comprises a pair of sealing members 438 and 439 and, disposed axially therebetween, an intermediate annular member 490. Sealing members 438 and 439 are formed from a suitable elastomeric material such as nitrile rubber, whilst intermediate annular member 490 is formed from a more rigid material such as polyacetal. Sealing members 438 and 439 each have inclined surfaces 438*a* and 439*a* which abut against inclined surfaces 401*a* and 402*a* of the two body portions 401 and 402. At the axially innermost ends, the two sealing members 438 and 439 each have generally convex surfaces 438*b* and 439*b* which abut against the concave axial surfaces 490*a* and 490*b* of the intermediate annular member 490.

In use, as the two body portions 401 and 402 are tightened together, the sealing members 438 and 439 are compressed between the inclined axial surfaces 401*a* and 402*a* of the respective body portions, and the axial surfaces 490*a* and 490*b* of the intermediate annular element 490. As with the previous embodiments illustrated, the axial compression leads to the sealing members being deformed radially inwardly such that they form a seal against the conduit tubes T1 and T2, and the reduced diameter portions 438*c* and 439*c* are urged into sealing engagement with the fibre optic cable (not shown).

The arrangement shown in FIG. 12 is particularly useful when the connector is of a larger internal diameter. In this case, the intermediate annular member 490 increases the extent of radial inward deformation of the sealing member, thereby enabling a gas-tight seal to be formed with the fibre optics cable.

It will readily be appreciated that the embodiments illustrated in the figures are by way of exemplification only and that numerous modifications and alterations may be made without departing from the principles underlying this invention. For example, the push-fit connection mechanism at either end of the connector could be replaced by a compression mechanism involving screw collars. Such compression mechanism are well known. All such modifications and alterations are within the scope of this application.

I claim:

1. A connector having connected to the ends thereof a pair of conduit tubes of the type which carry fibre-optics communications cables; the connector comprising a body having two main body portions arranged for relative axial movement therebetween;

a through bore, in the body, through which a fibre-optics cable is disposed, a conduit tube positioned at each end of the body for carrying the cable, each conduit tube having an end in the body;

means for drawing the two main body portions together;

a pair of first resilient sealing means, each first resilient sealing means encircles one of the conduit tubes;

compression means for compressing each first resilient sealing means against the conduit tube around the circumference thereof so as to provide a substantially gas-tight seal between the body and the conduit tube; and second resilient sealing means disposed axially between the pair of first resilient sealing means for sealing against the fibre-optics cable, such that the second resilient sealing means is between two confronting surfaces of the two main body portions;

wherein the second resilient means includes a through bore through which the fibre-optics cable can pass when the two main body portions have been connected together and the second resilient sealing means is in an uncompressed or lightly compressed state, the second resilient sealing means being compressible thereafter by tightening the two main body portions together so as to deform the second resilient sealing means radially inward and into sealing contact with the fibre-optic cable, thereby to form a substantially gas-tight seal between the body and the fibre-optic cable.

2. A connector according to claim 1 wherein the first and second resilient sealing means are constituted by a unitary sealing member.

3. A connector for connecting to an end of a conduit tube of the type which carries fibre-optics communications cables, the connector comprising:

a body having two main body portions arranged for relative axial movement therebetween;

a through bore, extending through the body, through which a fibre-optics cable may pass, a conduit tube having an end positioned at one end of the body for carrying the cable means for drawing the two main body portions together;

first resilient sealing means for encircling the conduit tube;

compression means for compressing the first resilient sealing means against the conduit tube around its circumference so as to provide a substantially gas-tight seal between the body and the conduit tube; and second resilient sealing means disposed axially between two confronting surfaces of the two main body portions the second resilient sealing means being compressible by tightening the two main body portions together so as to deform the second resilient sealing means radially inwardly and into sealing contact with the fibre-optic cable, thereby to form a substantially gas-tight seal between the body and the fibre-optic cable;

wherein the first and second resilient sealing means are constituted by a unitary sealing member, the unitary sealing member having an enlarged diameter portion for receiving the end of the conduit tube, and a reduced diameter portion for receiving the fibre-optics cable.

4. A connector according to claim 3 wherein the enlarged diameter portion and reduced diameter portion are separated by a generally axially oriented circumferential face.

5. A connector according to claim 4 wherein the generally axially oriented circumferential face is orthogonal to the longitudinal axis of the connector body.

6. A connector according to claim 1 wherein the first and second resilient sealing means are separate entities.

7. A connector according to claim 6 wherein the first resilient sealing means is axially spaced apart from the second resilient sealing means.

8. A connector according to claim 6 wherein the first resilient sealing means takes the form of an array of one or more compressible O-rings.

9. A connector for connecting to an end of a conduit tube of the type which carries fibre-optics communications cables, the connector comprising:

a body having two main body portions arranged for relative axial movement therebetween;

a through bore, extending through the body, through which a fibre-optics cable may pass, a conduit tube having an end positioned at one end of the body for carrying the cable;

means for drawing the two main body portions together;

first resilient sealing means encircling the conduit tube;

compression means for compressing the first resilient sealing means against the conduit tube around its circumference so as to provide a substantially gas-tight seal between the body and the conduit tube; and second resilient sealing means disposed axially between two confronting surfaces of the two main body portions, the second resilient sealing means being compressible by tightening the two main body portions together so as to deform the second resilient sealing means radially inwardly and into sealing contact with the fibre-optic cable, thereby to form a substantially gas-tight seal between the body and the fibre-optic cable;

wherein the first and second resilient sealing means are separate entities, and wherein one of the body portions has a socket formation arranged to receive a spigot formation on the other body portion.

10. A connector according to claim 1 wherein the means for enabling the said portions to be drawn together takes the form of a threaded collar associated with one body portion which engages a thread on the exterior of the other body portion.

11. A connector according to claim 10 wherein the threaded collar is rotatably mounted on one portion such that it does not cause rotation of the said one body portion when it is threaded onto the other body portion.

12. A connector according to claim 1 wherein the two main body portions together define an annular recess therebetween in which a sealing member combining the second resilient sealing means sits.

13. A connector for connecting to an end of a conduit tube of the type which carries fibre-optics communication cables; the connector comprising a body having a through bore through which a fibre-optics cable may pass; at least one end of the body being arranged to receive therein an end of a conduit tube for carrying the cable; the body having two main body portions arranged for relative axial movement therebetween, the two main body portions together defining an annular recess therebetween in which is disposed a unitary sealing member, the unitary sealing member comprising first resilient sealing means for encircling the conduit tube, and second resilient sealing means, the arrangement being such that tightening the two main body portions together causes compression of the sealing member between confronting surfaces of the respective body portions such that the first resilient sealing means is deformed radially inwardly and into sealing contact with the conduit tube and the second resilient sealing means is deformed radially inwardly and into sealing contact with the fibre-optic cable thereby to form a substantially gas-tight seal between the body and the conduit tube and a substantially gas-tight seal between the body and the fibre-optics cable.

14. A connector according to claim 7 wherein the first resilient sealing means takes the form of an array of one or more compressible O-rings.

15. A connector according to claim 2 wherein the unitary sealing member has an enlarged diameter portion for receiving the end of the conduit tube, and a reduced diameter portion for receiving the fibre-optics cable.

16. A connector according to claim 15 wherein the enlarged diameter portion and reduced diameter portion are separated by a generally axially oriented circumferential face.

17. A connector according to claim 16 wherein the generally axially oriented circumferential face is orthogonal to the longitudinal axis of the connector body.

18. A connector according to claim 1 wherein one of the body portions has a socket formation arranged to receive a spigot formation on the other body portion.

19. A method of forming a gas block in a fibre-optics communication line comprising a fibre-optics cable disposed within a conduit tube, which method comprises connecting to an end of a length of conduit tube a connector as defined in claim 1, inserting a fibre-optics cable into a conduit tube and connector and drawing the two body portions of the connector together such that the first resilient sealing means of the connector is compressed against the conduit tube around its circumference to provide a substantially gas-tight seal between the connector body and the conduit tube, and the second resilient sealing means of the connector is compressed against the fibre-optic cable so as to form a substantially gas-tight seal between the connector body and the fibre-optic cable.

* * * * *